United States Patent [19]

Fukuzawa et al.

[11] Patent Number: 5,247,620
[45] Date of Patent: Sep. 21, 1993

[54] BRIDGE APPARATUS WITH AN ADDRESS CHECK CIRCUIT FOR INTERCONNECTING NETWORKS

[75] Inventors: Junji Fukuzawa, Sagamihara; Akira Watanabe, Hitachi; Matsuaki Terada, Machida; Sadao Mizokawa, Katsuta, all of Japan

[73] Assignees: Hitachi, Ltd.; Hitachi Cable Ltd., both of Tokyo, Japan

[21] Appl. No.: 554,872

[22] Filed: Jul. 20, 1990

[30] Foreign Application Priority Data

Jul. 24, 1989 [JP] Japan .................... 1-190831

[51] Int. Cl.⁵ .................... G06F 7/02; G06F 9/06; G06F 13/10; G06F 13/20
[52] U.S. Cl. .................... 395/325; 364/228; 364/229.5; 364/230; 364/230.5; 364/238.2; 364/238.6; 364/239; 364/240; 364/240.5; 364/242.94; 364/242.96; 364/251.3; 364/251.4; 364/259.2; 364/259.9; 364/265.5; 364/DIG. 1; 364/DIG. 2
[58] Field of Search ............... 395/800, 325, 375, 200, 395/725, 275, 425; 370/85.13, 85.12

[56] References Cited

U.S. PATENT DOCUMENTS

| | | | |
|---|---|---|---|
| 4,506,360 | 3/1985 | Kryskow, Jr. et al. | 370/85.4 |
| 4,922,503 | 5/1990 | Leone | 370/85.13 |
| 4,933,937 | 6/1990 | Konishi | 370/85.13 |
| 5,027,350 | 6/1991 | Marshall | 370/85.13 |
| 5,032,987 | 7/1991 | Broder et al. | 395/200 |

FOREIGN PATENT DOCUMENTS 63-20626 1/1988 Japan .
63-20627 1/1988 Japan .
63-20628 1/1988 Japan .
63-138831 6/1988 Japan .

OTHER PUBLICATIONS

IEEE Network, vol. 2, No. 1, pp. 5-9, pp. 10-15.

Primary Examiner—Robert B. Harrell
Assistant Examiner—Daniel H. Pan
Attorney, Agent, or Firm—Antonelli, Terry, Stout & Kraus

[57] ABSTRACT

A bridge apparatus for interconnecting networks in which at least two networks including a plurality of stations are connected, and which, when a transmission frame including an identifier of one station and an identifier of another station of a destination is received from the one station, forwards the transmission frame to a network to which the another station belongs based on the identifier of another station. A processor of the bridge apparatus for interconnecting networks performs delivery control of the transmission frame using an information which has been read out of an address check circuit for identifying the network to which the another station belongs with the identifier of the another station which is included in the transmission frame. The address check circuit comprises at least one hash memory in which hash computation results of respective addresses have been stored at respective address positions, and an address memory for storing a plurality of address informations showing a corresponding relationship between identifiers of respective stations and identifiers of respective networks at respective address positions.

17 Claims, 10 Drawing Sheets

BRIDGE APPARATUS WITH AN ADDRESS CHECK CIRCUIT FOR INTERCONNECTING NETWORKS

BACKGROUND OF THE INVENTION

The present invention relates to a bridge for interconnecting networks, that is, an apparatus for interconnecting networks such as a Local Area Network (hereinafter referred to as a "LAN").

The operation and the function of a conventional LAN interconnecting bridge are discussed, for example, in IEEE Network vol. 2, No. 1, pp. 5-9, pp. 10-15, 1988.

Further, a circuit disclosed in JP-A No. 60-152145 for instance is known as an example of another LAN interconnecting bridge. This circuit is composed in such a manner that two LAN interface circuits and a data processor are coupled by means of a 3 port buffer memory, and necessity of transit or forwarding of frames received at above-described buffer memory from a LAN on one side is judged by checking a destination Media Access Control (MAC) address using an address check control unit, and when forwarding is required, that is, when the destination does not exist in the LAN on the side of receiving the frames, the frames are transmitted to another LAN. In the above-described check control circuit, there is provided a table which is formed by learning from source addresses of the received frames for storing a list of MAC addresses of stations connected to respective LANs. As a registration/deletion/search system for this table, a binary search scheme by means of hardwares is used.

In addition, as other prior arts related to address check, techniques such as disclosed in JP-A Nos. 63-138831 and 63-20626 - 20628 have been known. The former is a system in which an address information storage table and a hash function memory which stores a plurality of hash functions for obtaining table entry numbers from addresses are provided, and a processor performs reference to this hash function memory and reference/renewal or update of the address storing table, thereby to perform check/registration of addresses. In the latter, a string search device is used for the address storing table.

Among above-described prior arts, the first circuit using 3 port buffer memory perform address check for judging necessity for forwarding received frames by using the binary search scheme by means of hardwares. Therefore, search processing takes time. Furthermore, since it is required to sort table entry in advance, a processing to shift the entries behind the entry number which is newly registered in the rear of the table is required at the time of entry registration, and further, a processing to place the entries behind the relevant entry close frontward is required at the time of entry deletion. Because of such reasons, there is a problem that address check and processing of maintenance and management of the address information storage table take time, thus lowering frame forwarding performance of the bridge.

In the second system using a hash memory in which a plurality of hash functions are stored, the hash function which is used is altered by varying the capacity of the address information storage table in accordance with the variation of the number of the registered entries of the address information table. Therefore, registration processing of information having been stored in the table is required again depending on the variation of the number of the registered entries. Furthermore, the hash function memory and the entry registration table are separated and all of processings of search/comparison/deletion/registration have to be performed by means of softwares. Thus, there is a problem that the overhead becomes large and frame forwarding performance of the bridge is lowered.

Also, in a third technique in which a string search device is used for the address storage table, all the processings of search/comparison/deletion/registration are executed by means of hardwares. In this case, since comparison among a plurality of entries is executed successively with one comparator, there is a problem that processing takes time and it is also difficult to prepare the table of a large capacity.

SUMMARY OF THE INVENTION

It is a first object of the present invention which has been made in view of above-described circumstances to provide a bridge interconnecting networks in which speed-up of address check processing for judging necessity of frame forwarding and so forth and learning processing of the station addresses of stations interconnecting networks and minimization of the overhead are devised so as to make rapid coupling among networks possible. It is a second object of the present invention to provide a bridge interconnecting networks which makes it possible to make effective use of the address information storage memory, for example, even in case characteristics of distribution of station addresses connected to respective networks and the hash function which stores sequence of function values thereof in the address information storage memory do not match each other and "collision" in which different station addresses are mapped at the same entry number occurs frequently in address information registration into the address information storage table. Moreover, it is a third object of the present invention to provide a bridge interconnecting networks which makes it possible to monitor for a remaining time of registration entries being effective in the address information storage memory directly from the processor.

In order to achieve above-described first object, an apparatus for interconnecting networks of the present invention is connected to at least two networks having a plurality of stations and has such a function that, when a transmitted frame including a first station identifier and a second station identifier of another second station is received from the first station, the transmitted frame is forwarded to the network to which the second station belongs based on the second station identifier, and, to be concrete, the apparatus for interconnecting networks comprises an interface circuit (such as a LAN control LSI) which is connected to respective networks and performs reception error control of the transmitted frame, a buffer memory for storing temporarily the transmitted frames received from the first station through the interface circuit, a processor which is activated by a control signal notified from the interface circuit by the fact that the transmitted frame is received so as to perform delivery control of the transmitted frame, and an address check circuit which is controlled by the processor and identifies the network to which the second station belongs from the second station identifier included in the transmitted frame, wherein said address check circuit includes:

at least one first hash memory in which a first hash computation result of each address has been stored at each address position, the hash memory outputs, when the second station identifier (for example, 48 bits) is given as an address value, the first hash computation result (for example, 24 bits) which has been stored at a position corresponding to the address value;

a selector which extracts predetermined bits (for example, 13 bits) from the first hash computation result which has been output from the first hash memory;

a first address memory (for example, an address information RAM) for storing a plurality of address informations showing the corresponding relationship between respective station identifiers and respective network identifiers at respective address positions, the first address memory notifying said processor of the first address information which has been stored at the position of the address value when the bits extracted by the selector are given as an address value, and the processor forwarding the transmitted frame which has been stored in the buffer memory to the network corresponding to the network identifier included in the first address information in accordance with the notification of the first address information from the address check circuit; and a control circuit for performing data readout control from the hash memory and the selector and data read-write control on the address memory.

Furthermore, the above-described apparatus for interconnecting networks is an apparatus for interconnecting networks which connects two and more networks, wherein, in a bridge for interconnecting networks which includes respective network interface circuit, a processor and a buffer memory, possesses said buffer memory in common by coupling abovesaid network interface circuits and processor with each other through a memory bus, and is provided with an address check circuit for performing storage/search of address information of the stations connected to respective networks, the address check circuit is composed of an address check control circuit which performs registration/deletion/search of address information and an address information storage memory, and the address information memory is composed, so that table entry numbers are made to correspond to the address information memory from given station addresses using the hash function, and a mode of performing registration/deletion/search of the station address information and a mode of referring directly from the processor are made switchable to each other.

Further, in order to achieve above-described second object, a second address memory (for example, an address information storage overflow memory) is provided additionally to an address check circuit of an apparatus for interconnecting networks of the present invention, a second address information other than the first address information which is to be output when the bits extracted by the selector are given to said first address memory as an address value is stored in the second address memory, and, when the third station identifier included in the first address information and the second station identifier included in the frame received from the first station are not in accord with each other, the control circuit compares a fourth station identifier included in the second address information with the second station identifier, and notifies the processor of the network corresponding to the network identifier included in the second address information as the network to which the second station belongs when they are in accord with each other.

Further, in order to achieve above-described third object, when a third station identifier included in the first address information which has been read from the first address memory and the second station identifier included in the frame received from the first station are in accord with each other, a control circuit of an apparatus for interconnecting networks of the present invention notifies the processor of the first address information, enters a predetermined counter numeric value (for example, an initial value n) in an age field of the first address information on the first address memory, and the processor detects the counter numeric values included in respective address informations on the first address memory at a predetermined period, and, when the counter numeric value is smaller than a predetermined first constant, deletes the address information including the counter numeric value, and, when the counter numeric value is more than the first constant, renews the counter value to a value obtained by subtracting a second constant (for example, 1) from the counter value.

In a bridge interconnecting networks according to the present invention, two or more network interface circuits and a processor portion are coupled with each other through the memory bus of the buffer memory. Therefore, it is possible to transmit a frame received by a certain network interface circuit and stored in said buffer memory to another network interface circuit as it is without copying the data. Furthermore, it is also possible to provide two or more network interfaces within a range in which transmit underrun error/receive overrun error are not generated taking the access speed of the memory and the transmission speed of the network into consideration.

Further, in case the address information is deleted when the age field of each entry of the address information memory is subtracted in every period, the station corresponding to the above initializes as often as the frame of the source is received, and the value of the age field becomes zero, it is possible to renew the contents of the address information memory automatically in accordance with detachment from the network and movement to other network of the station. Further, when the address information memory is made to be also accessible directly from the processor portion, it is possible to monitor the term of entry's validity (effective remaining time of registration circuits).

Furthermore, when it is arranged to include a field in which each entry shows either static entry or dynamic entry in each entry of the address information memory, it is possible to keep the entry resident without being deleted from the address information memory by setting the field as the dynamic entry even in case of a station which does not transmit the frames periodically.

Moreover, when a second address information memory is provided in addition to the address information memory, it is possible, in registration of the address information, to try to register it first in the address information memory and to register it in the second address information memory only in case of failure in first registration, thus duplicate registration in two memories will never occur.

The foregoing and other objects, advantages, manner of operation and novel features of the present invention will be understood from the following detailed description when read in connection with the accompanying drawings.

DESCRIPTION OF THE PREFERRED EMBODIMENTS

Embodiments of the present invention will be explained in detail hereafter with reference to the drawings.

Figure 1:
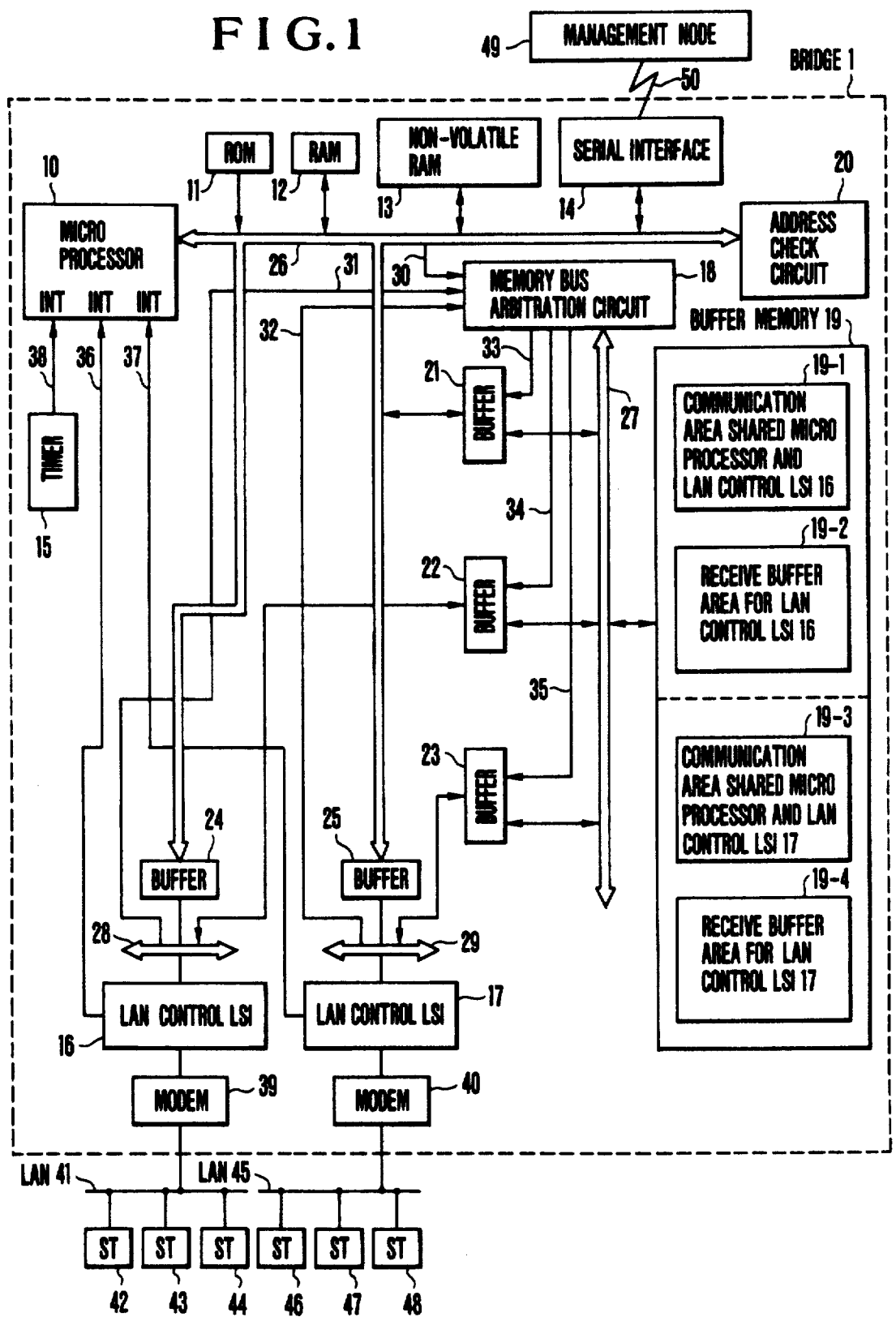
FIG. 1 is a block diagram of a bridge showing an embodiment of the present invention.

FIG. 1 is a block diagram of a LAN interconnecting bridge (hereinafter referred to simply as a "bridge") showing an embodiment of the present invention.

In the Figure, reference numeral 1 indicates a bridge, 10 indicates a microprocessor which controls the whole unit, 11 indicates a ROM for storing a program of the microprocessor 10, 12 indicates a RAM for storing programs and tables while the microprocessor 10 is in operation, 13 indicates a nonvolatile RAM for storing initializing parameters of the present bridge 1, 14 indicates a serial interface for communicating with a management node 49 which will be described later and other apparatus, 15 indicates a timer, 16 and 17 are LAN control LSIs, 18 indicates a memory bus arbitration circuit, 19 indicates a buffer memory, and 20 indicates an address check circuit which will be described later. The buffer memory 19 is connected to a processor bus 26 through above-described respective components. Besides, 41 and 45 denote LANs, 42 to 44 and 46 to 48 denote stations (ST), 49 denotes a management node, and 50 denotes a communication line for connecting the management node 49 and the bridge 1 with each other.

Figure 2:
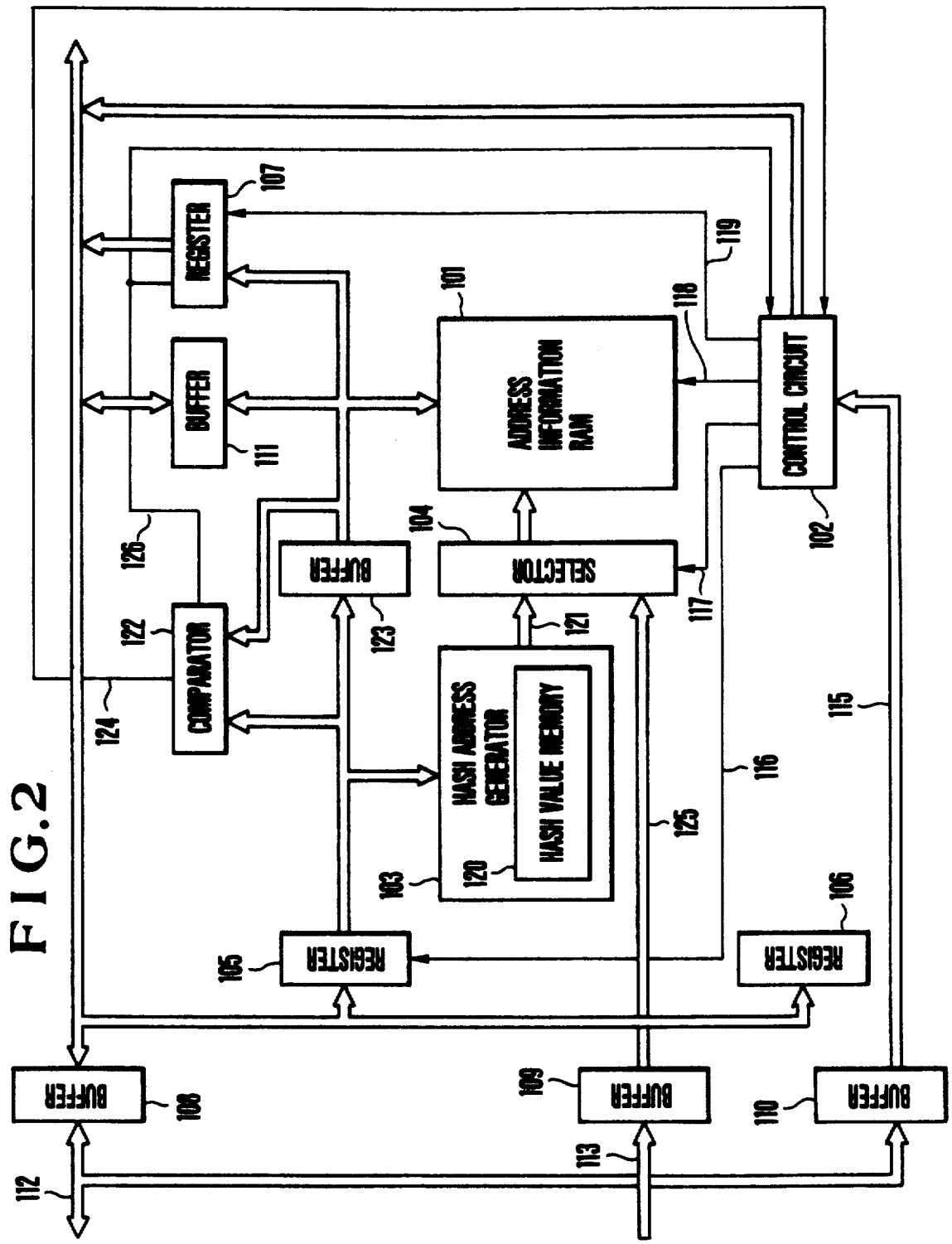
FIG. 2 is a diagram showing a composition example of an address check circuit.
Figure 3:
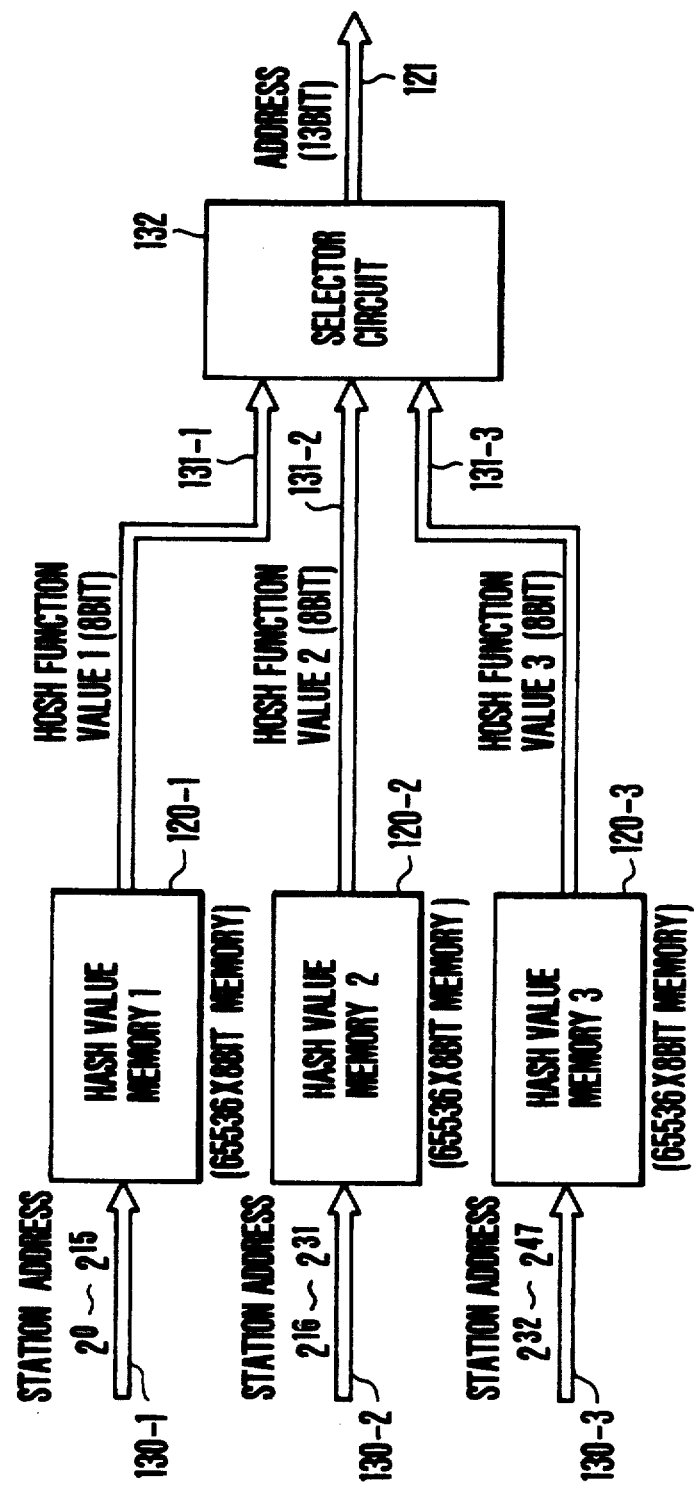
FIG. 3 is a diagram showing a composition example of a hash address generator.

FIG. 2 shows a detailed composition example of above-described address check circuit 20. In the Figure, 101 indicates an address information RAM, 102 indicates a control circuit, 103 indicates a hash address generator, 104 indicates a selector, and 105 to 107 indicate registers. FIG. 3 shows a detailed composition example of above-described hash address generator 103. In the Figure, 120-1 to 120-3 indicate hash value memories, and 132 indicates a selector circuit.

Figure 4:
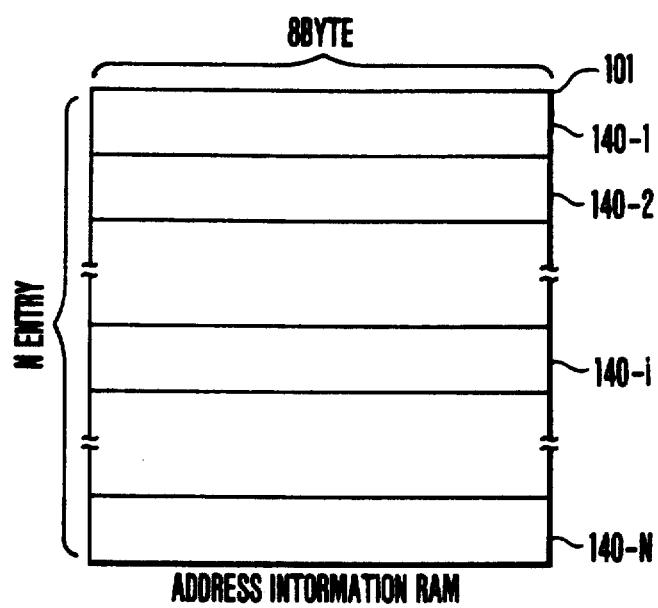
FIG. 4 is a composition diagram of an address information memory in the address check circuit.
Figure 5:
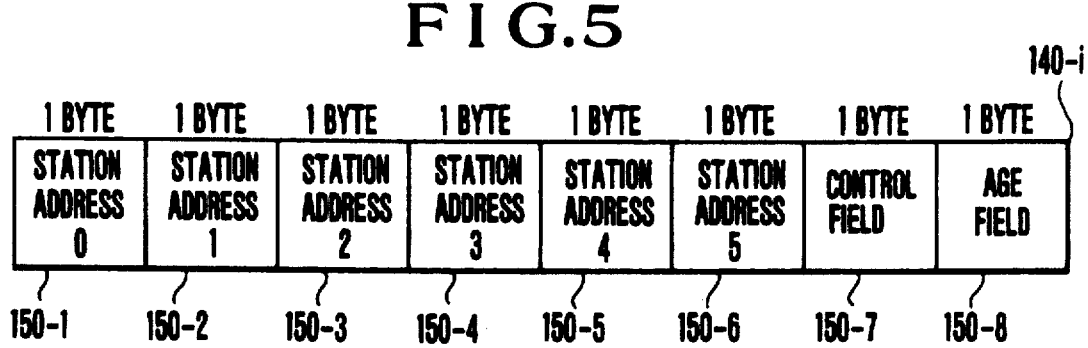
FIG. 5 is a composition diagram of each entry of the address information memory.
Figure 6:
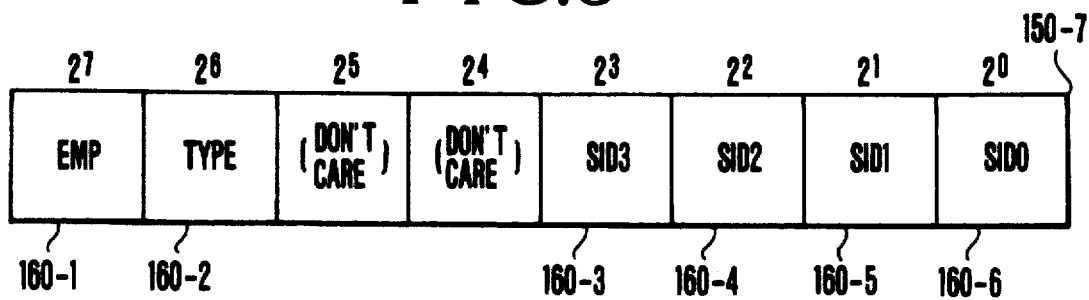
FIG. 6 is a composition diagram of the control field in the entry.

FIG. 4 is a composition diagram of the address information RAM 101 shown in FIG. 2. In FIG. 4, 140-1 to 140-N indicate entries. Further, FIG. 5 shows a composition example of entries 140-1 to 140-N in the address information RAM 101, in which 150-1 to 150-6 indicate station addresses, 150-7 indicates a control field and 150-8 indicates an age field. FIG. 6 shows a composition example of abovesaid control field 150-7, in which 160-1 indicates an entry busy/free bit (bit indicative of entry busy/free), 160-2 indicates an entry type bit showing whether the entry is a static entry or a dynamic entry, and 160-3 to 160-6 indicate segment number fields showing numbers of connected LANs.

In the bridge 1 of the present embodiment interconnecting two LANs 41 and 45, the buffer memory 19 is connected to the processor bus 26 through above-described respective components. To a memory bus 27 controlled by the memory bus arbitration circuit 18 which receives a buffer memory access request 30 of said microprocessor 10, a buffer memory access request 31 of the LAN control LSI 16 and a buffer memory access request 32 of the LAN control LSI 17, and outputs buffer memory access permissive signals 33 to 35, said buffer memory 19 is connected and is accessed from the microprocessor 10 and the LAN control LSIs 16 and 17 through buffers 21 to 23.

The buffer memory 19 includes a communication area 19-1 shared microprocessor 10 and LAN control LSI 16, a receive buffer area 19-2 for LAN control LSI 16, a communication area 19-3 shared microprocessor 10 and LAN control LSI 17, and a receive buffer area 19-4 for LAN control LSI 17. The LAN control LSI 16 is connected to the LAN 41 through a modem 39 and communicates with stations 42 to 44. Similarly, the LAN control LSI 17 is connected to the LAN 45 through a modem 40 and communicates with stations 46 to 48. Besides, abovesaid modems 39 and 40 may be dispensed with in the case of a LAN which does not require a modem. Furthermore, the number of stations connected to the LANs 41 and 45 is optional. Further, two LANs are connected here, but it is a matter of course that three or more LANs are employed.

Occurrence of events such as reception of frame and transmission of frame in the LAN control LSIs 16 and 17 is notified to the microprocessor 10 by interrupt signals 36 and 37, respectively. An interrupt signal 38 is applied from the timer 15 in every period which is set by the microprocessor 10.

The outline of operation of a bridge in the present embodiment which is composed as described above will be explained with reference to FIG. 1.

Here, it is assumed that a frame is transmitted from the station 42 to the station 48. The station 42 transmits a frame including a destination station address in 48 bits, a source station address in 48 bits, a frame type, a user's data of variable length and a field for confirming existence of an error. At the destination station address of the frame from the station 42, the station address of the station 48 is set, and, at the source station address, the station address of the station 42 is set.

The above-described frame is forwarded to the LAN control LSI 16, and the LAN control LSI 16 forwards the frame to the receive buffer area 19-2 for LAN control LSI 16 of the buffer memory 19 through the LAN control LSI local bus 28, the buffer 22 and the memory bus 27 while checking the format and bit errors in the frame. When the LAN control LSI 16 did not detect format errors and bit errors of the frame, the LAN control LSI 16 creates an information to notify of frame reception to the communication area 19-1 shared microprocessor 10 and LAN control LSI 16, and sends an interrupt signal 36 to the microprocessor 10.

The microprocessor 10 refers to the information in the communication area 19-1 in accordance with the interrupt signal 36, performs frame check, address check and address learning described later on frames stored in the receive buffer area 19-2. When it is judged that transmission to the LAN 45 is appropriate, the microprocessor 10 creates frame transmission request information in the communication area 19-3, and gives instruction to the LAN control LSI 17 to transmit the frame in the receive buffer area 19-2. At this time, neither alteration nor copying of data is required on the frame receiving by the LAN control LSI 16.

The LAN control LSI 17 interprets the frame transmission request information in the communication area 19-3, and fetches the frame in the receive buffer area 19-2 through the memory bus 27, the buffer 23 and a LAN control LSI local bus 29 and transmits it to the LAN 45 through the modem 40. With this, the frame arrives at the station 48. When frame transmission is complete, the LAN control LSI 17 generates a frame transmission complete signal in the communication area 19-3, and sends the interrupt signal 37 to the microprocessor 10.

In response to the above, the microprocessor 10 empties or releases the buffer which has stored transmission frames (frames received by the LAN control LSI 16) and returns it to a receive buffer pool which is managed by the LAN control LSI 16. Besides, when the microprocessor 10 judges that forwarding of the received frame to the LAN 45 is not required or is inappropriate, the microprocessor 10 releases the receive buffer in which received frames have been stored and returns it to the receive buffer pool which is managed by the LAN control LSI 16.

Also in the case of transmission from a station on the LAN 45 to a station on the LAN 41, the microprocessor 10 instructs the LAN control LSI 16 to transmit the received frames through check of the frames received by the LAN control LSI 17 in the receive buffer area 19-4, and returns the buffer to the receive buffer pool which is managed by the LAN control LSI 17 when transmission complete notification is received.

Next, the composition and the operation of the address check circuit 20 will be explained based on FIG. 2. The address check circuit 20 is connected to the microprocessor 10 through the processor bus 26 as described previously. A data bus 112 of a processor bus 26 is connected to buffers 108 and 110, and an address bus 113 is connected to a buffer 109. When the microprocessor 10 issues commands to the address check circuit 20, command codes are stored in a register 106, and parameters are stored in a register 105. The access to an address information RAM 101 which stores address information selects either one of the output 121 of a hash address generator 103 or an address 125 designated by the microprocessor 10 by means of a control signal 117 and a selector 104.

When a command which instructs address information search is issued, a station address in 6 bytes among those parameters given to the register 105 by the microprocessor 10 is given to the hash address generator 103 and a comparator 122. The hash address generator 103 creates or generates the hash address 121 from a value of a hash value memory 120, and applies it to the address information RAM 101 through the selector 104. With this, station address portions 150-1~6 of the entry pointed by the hash address are sent to the comparator 122, and attribute informations 150-7, 8 and the hash addresses are sent to the register 107.

The value of the entry busy/free bits 160-1 in the attribute information stored in the register 107 are given to the comparator 122 and the control circuit 102 through a signal line 126. When the signal line 126 shows entry busy, the comparator 122 compares the station address which is input from the register 105 and the stations address which is output from the address information RAM 101 with each other, and the result of comparison is notified to the control circuit 102 through a signal line 124, and is further reflected to a command execution result indication field in the register 107 through a signal line 119.

When a command indicating address information registration is issued, similarly to above-described command instructing address information retrieval, a corresponding hash address 121 is generated from the station address in 6 bytes among those parameters that are given to the register 105 by the microprocessor 10 and is given to the address information RAM 101 through the selector 104, and the contents of the entry busy/free bits 160-1 pointed by said hash address are transferred to the register 107. The result of entry busy/free bits 160-1 is notified from the register 107 to the control circuit 102 through the signal line 126. In the case of entry free, the station address and the attribute information in the register 105 are registered in the entry pointed by the hash address, and positive confirmation of registration and the hash address are set in the register 107.

Next, when a command instructing deletion of address information is issued, similarly to the command instructing address information retrieval, the corresponding hash address 121 is generated from the station address in 6 bytes among parameters given by the microprocessor 10 to the register 105 and is given to the address information RAM 101 through the selector 104, and station address portions 160-1~6 of the entry pointed by the hash address are sent to the comparator 122 and attribute informations 150-7, 8 and the hash address are sent to the register 107. The value of the entry busy/free bits 160-1 in the attribute information stored in the register 107 is given to the comparator 122 and the control circuit 102 through the signal line 126.

When the signal line 126 shows entry busy, the comparator 122 compares the station address which is input from the register 105 and the station address which is output from the address information RAM 101 with each other, and the result of comparison is notified to the control circuit 102 through the signal line 126. When two station addresses are in accord with each other and an entry type bits 160-2 of the entry show a dynamic entry, the entry busy/free bits 160-1 pointed by the hash address is set to free through a buffer 111. In case two station addresses are in disaccord with each other, the result is set in the register 107.

The foregoing is a processing related to speed-up of original processing of the bridge, and corresponds to above-described first mode. Further, when the address of the address information RAM 101 is input to the address bus 113 from the processor 10 under a state that above-described respective commands have not been issued from the processor 10, access is made to the address information RAM 101 through the buffer 109, the address bus 125 and the selector 104, and the contents of the designated memory are output to the data bus 112 of the processor 10 through buffers 111 and 108. This corresponds to above-described second mode in which reference is made directly from the processor.

Next, the composition of the hash address generator 103 will be explained in accordance with FIG. 3. A hash function value which has been computed in advance is stored by being divided into, for example, three pieces of 65536×8 bits memories. The station address in 48 bits is divided into, for example, 130-1 to 130-3 by 16 bits, which are input to hash value memories 120-1 to 120-3, respectively. Hash values 131-1 to 131-3 by 8 bits obtained as the result of the above are input to a selection circuit 132. Furthermore, the hash value in 24 bits is compressed to 13 bits for instance, and a hash address 121 is generated.

Figure 12:
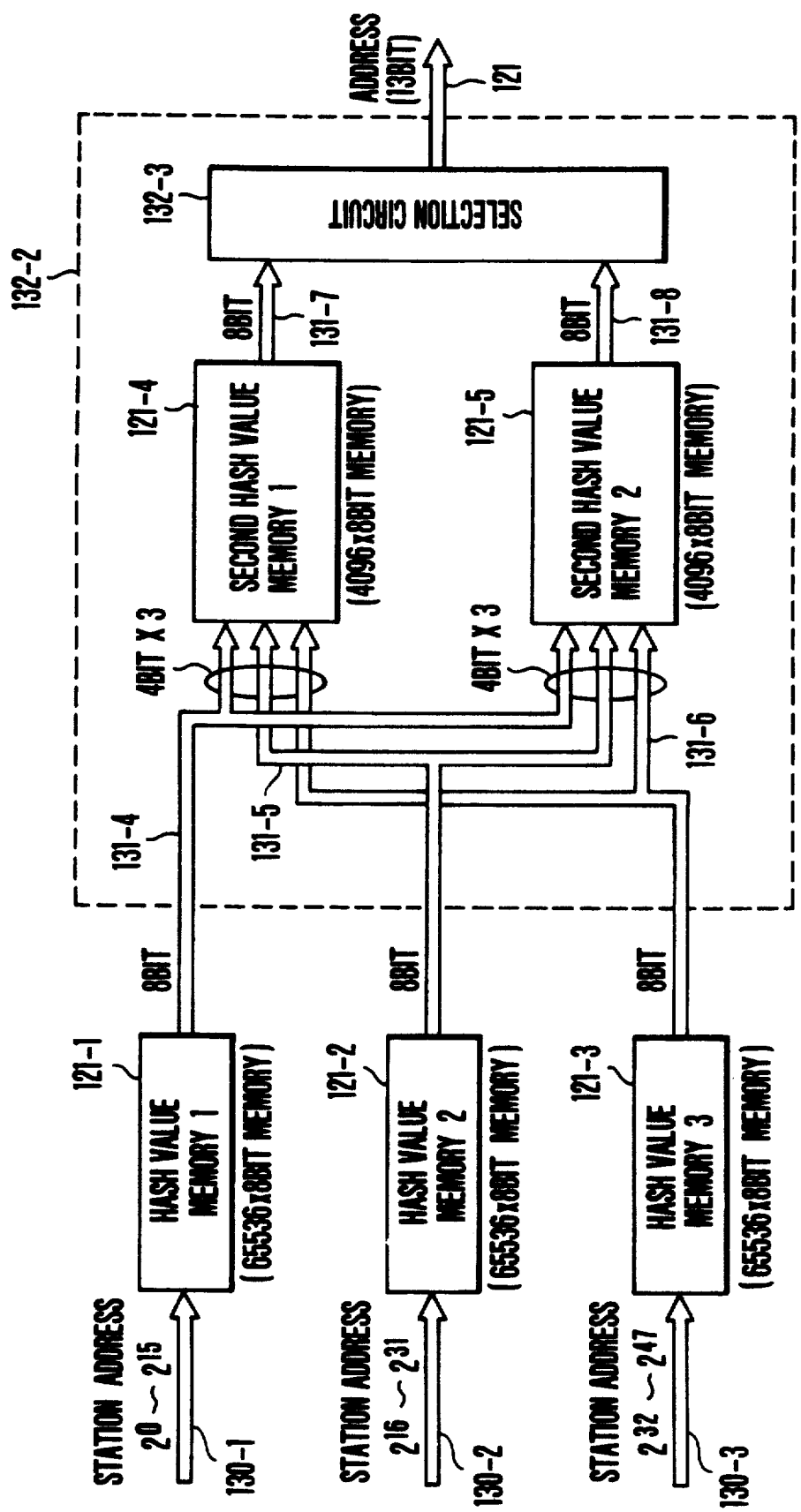
FIG. 12 is a diagram showing another composition example of a hash address generator.

Besides, it is also possible to form the selection circuit 132 of the hash address generator with a circuit 132-2 such as shown in FIG. 12.

The abovesaid circuit 132-2 is composed of hash value memories 121-4 and 121-5 on a second stage for converting 24-bit data which are read out of hash memories (121-1, 121-2, 121-3) on a first stage into 16-bit data, and a selection circuit 132-3 which extracts predetermined 13 bits from the 16-bit data which are read out of these hash value memories 121-4 and 121-5 on the second stage.

In the hash value memory 121-4 on the second stage, the results of hash computation of respective addresses are recorded in advance so that, when an address in 12 bits formed with respective four high order bits for instance among 8 bits which have been read out of hash value memories (121-1, 121-2, 121-3) on the first stage, respectively, is given, the result of hash computation of that address may be read. Further, also in the hash value memory 121-5 on the second stage, the results of hash computation of respective addresses are recorded in advance so that, when an address in 12 bits formed with respective four high order bits for instance among 8 bits which have been read out of hash value memories (121-1, 121-2, 121-3) on the first stage, respectively, is given, the result of hash computation of that address may be read.

By composing the hash address generator 103-2 of above-described hash value memories on the first and the second stages in such a manner, the result of hash computation influenced by all of the station address 48 bits becomes obtainable, and collision probability of station addresses used for delivery control of networks is small, thus resulting in efficient application of the memory.

Further, when it is assumed that the capacity of the memory may be made larger without any restriction, there is no problem in that the hash value memory in the hash address generator 103 is composed of only one memory in which the results of hash computation of respective addresses are stored at the positions of respective addresses in 48 bits, and the 48-bit data are converted directly into 13-bit data (illustration omitted).

Figure 7:
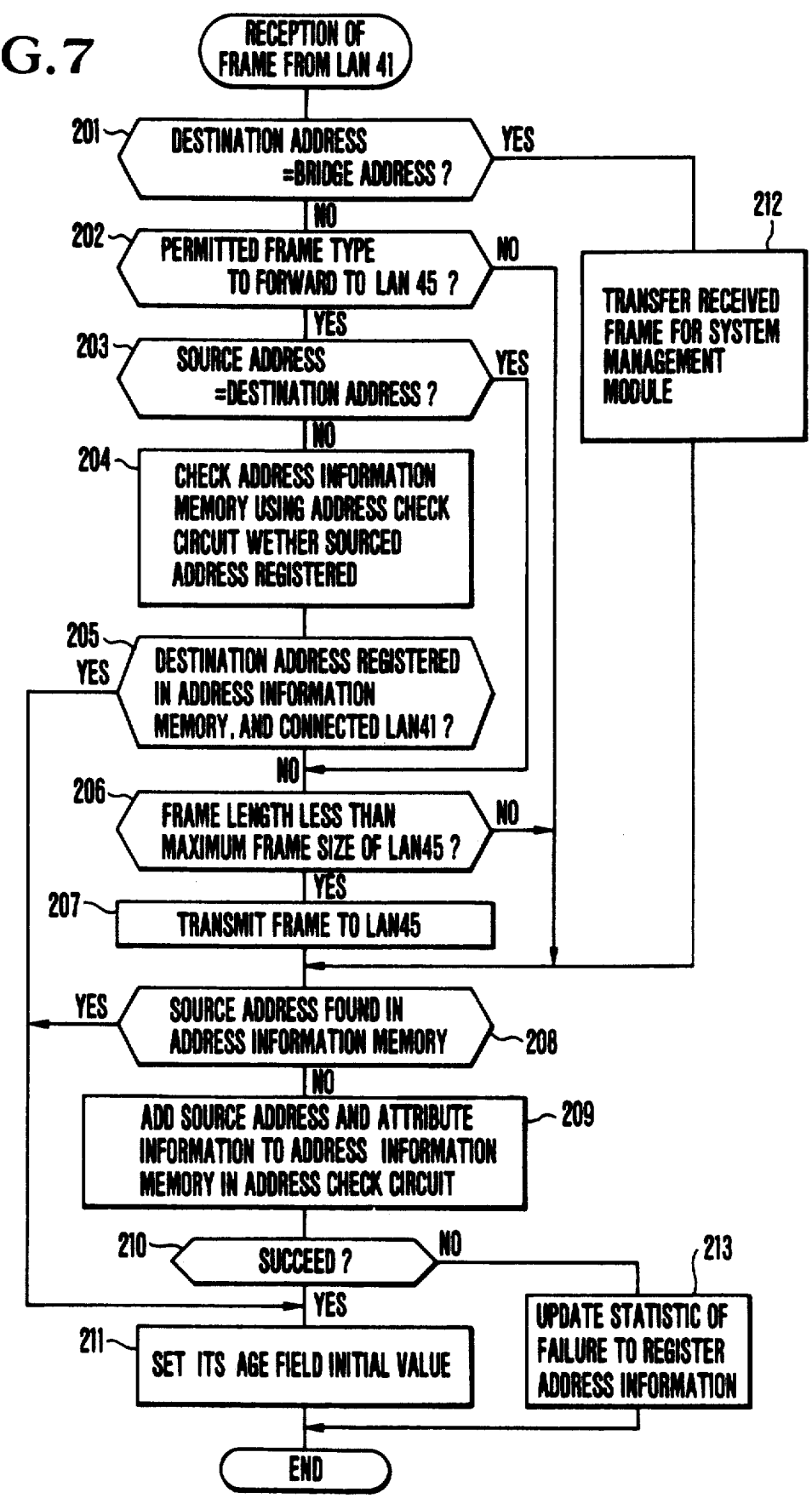
FIG. 7 shows a flow chart of frame forwarding processing.

Next, a series of operations, that is, frame check station address check, frame forwarding and station address learning will be explained in accordance with FIG. 7.

Now, when a frame is received, it is checked first whether the destination station address of the received frame is equal to the station address of the bridge 1 or not (step 201). When it is found as the check result that the received frame is addressed to the bridge 1, the frame is transferred to a system management module in the bridge 1 (step 212). Further, when the received frame is not addressed to the bridge 1, it is checked whether the frame type is, for example, a no-delay response frame or not (step 202), and forwarding processing is not executed in the case of a no-delay response frame.

When the frame is of a permitted frame type to be forwarded, it is checked in the next place whether the source station address and the destination station address are equal to each other or not (step 203). If they are equal to each other, the processing is advanced to a step 206. When they are not equal to each other, it is checked by using an address check circuit whether the destination station address has been registered in the address information RAM 101 or not (step 204). When it is found as the result of such check that the destination station address has been registered in the address information RAM 101 and above-described segment number indication fields 160-3 to 160-6 show the LAN 41, the received frame is addressed to the station on the LAN 41, which does not require forwarding, and the processing advances to a step 211.

When these conditions are not satisfied, that is, when the destination station address has not been registered in the address information RAM 101 or above-described segment number display fields 160-3 to 160-6 are registered so as to show the LAN 45, it is required to execute frame forwarding processing, and the processing is advanced to a step 206. In the step 206, the length of the received frame is checked. When the frame length exceeds the maximum frame length permitted by the LAN 45, the processing is advanced to a step 208 without forwarding. When the maximum frame length permitted by the LAN 45 is not exceeded, the received frame is transmitted to the LAN 45 (step 207).

In the step 208 and thereafter, station address learning processing is executed. First, in the step 208, it is checked whether the source address is registered in the address information RAM 101 or not. When it has been registered already, the processing is advanced to the step 211 without executing registration processing. When the source address is not registered, the processing is advanced to a step 209 in order to execute registration processing. In the step 209, a source station address, a segment number pointing the LAN 41, and an address information registration command as type=dynamic entry are issued to the address check circuit.

In a step 210, the result of command execution is checked, and the processing is advanced to a step 211 in case of successful registration, and advanced to a step 213 in case of failure. Besides, since the processing is advanced to the step 211 through steps 205, 208 or 210, the hash address corresponding to the source station address have been notified from the address check circuit, and the value of the age field of the entry pointed by this hash address is set as an initial value. Here, when the processing is advanced from the step 205, the hash address corresponding to the destination station address is only notified. However, the destination station address being equal to the source station address, the hash address is equal to the hash address corresponding to the source station address. In the step 213, increment static counter of failing to register address information is executed.

Figure 8:
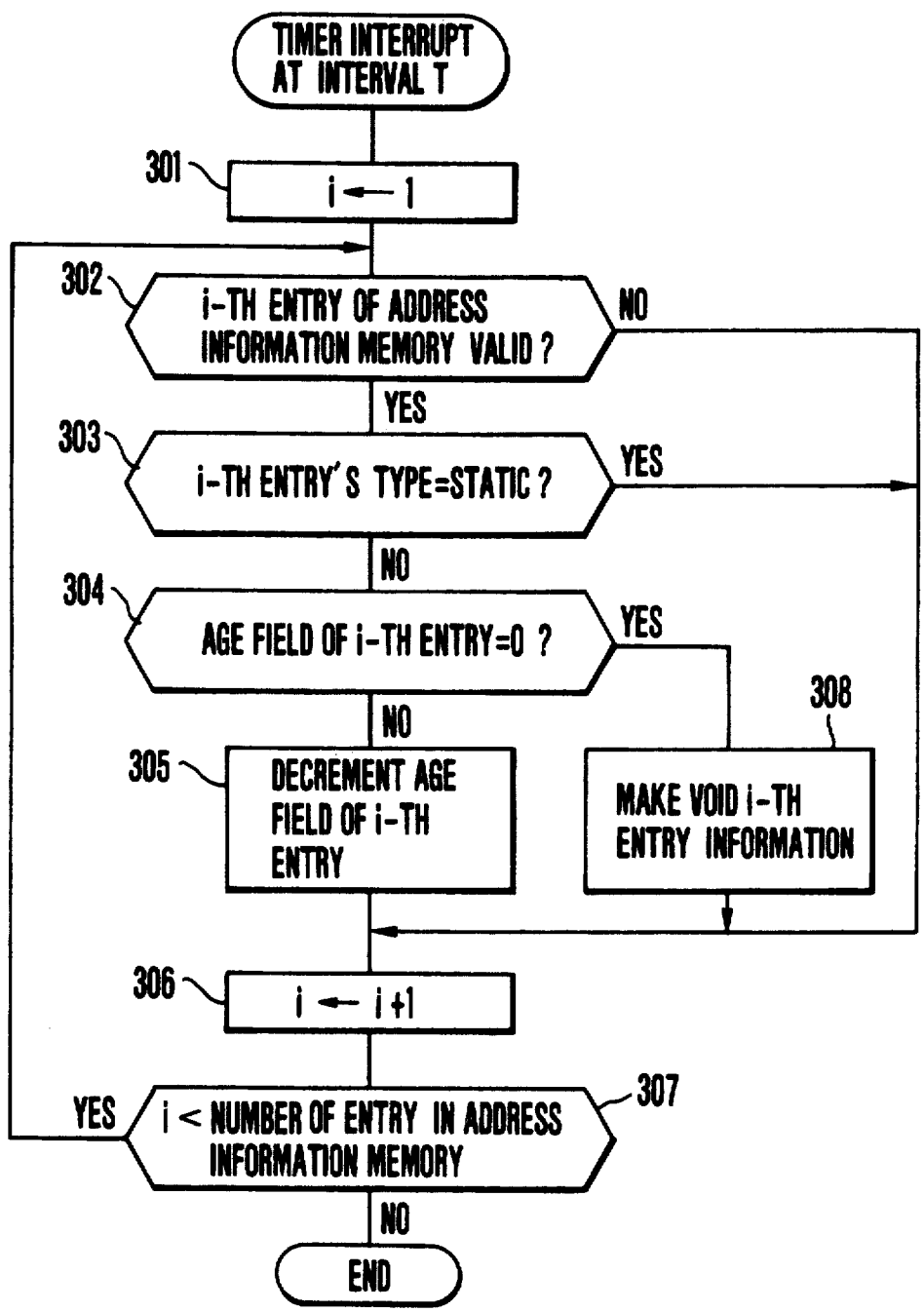
FIG. 8 shows a flow chart of age monitor processing of address information in the address check circuit.

Next, age control processing of the address information will be explained based on FIG. 8. When timer interrupt at an interval T is generated from abovesaid timer 15, the age field 150-8 of each of respective entries 140-1 to 140-N of the address information RAM 101 of the address check circuit is checked, renewed, and registration of an entry which has been brought under time-out is made void.

That is, a busy/free bits 160-1 of a control field 150-7 of the i-th entry is checked first so as to check whether the entry is busy or free (step 302). In case it is free, the processing is advanced to the check of next entry, and in case it is busy, the processing is advanced to a step 303, and a entry type indication bits 160-2 are checked. If the i-th entry is a static entry, the processing is advanced to the check of next entry. If the i-th entry is a dynamic entry, the processing is advanced to a step 304, and it is checked whether the value of the age field 150-8 is zero or not. If the value of the age field 150-8 of the i-th entry is zero, there is no frame which has been transmitted from the station of the i-th entry for a prescribed time and a busy/free bits 160-1 are set to free assuming that this station is not under an active state or has disengaged from the LAN (step 308). If the value of the age field 150-8 of the i-th entry is not zero, 1 is subtracted from the value of the age field (step 306). All of above-described steps are executed for all the entries.

According to the bridge shown in above-described embodiments, it is possible to realize speed-up of address check processing for judging the necessity of the frame forwarding and so forth and learning processing of the station address of the station for interconnecting networks, and minimization of the overhead and so forth.

Another embodiments of the present invention will be explained hereafter.

Figure 9:
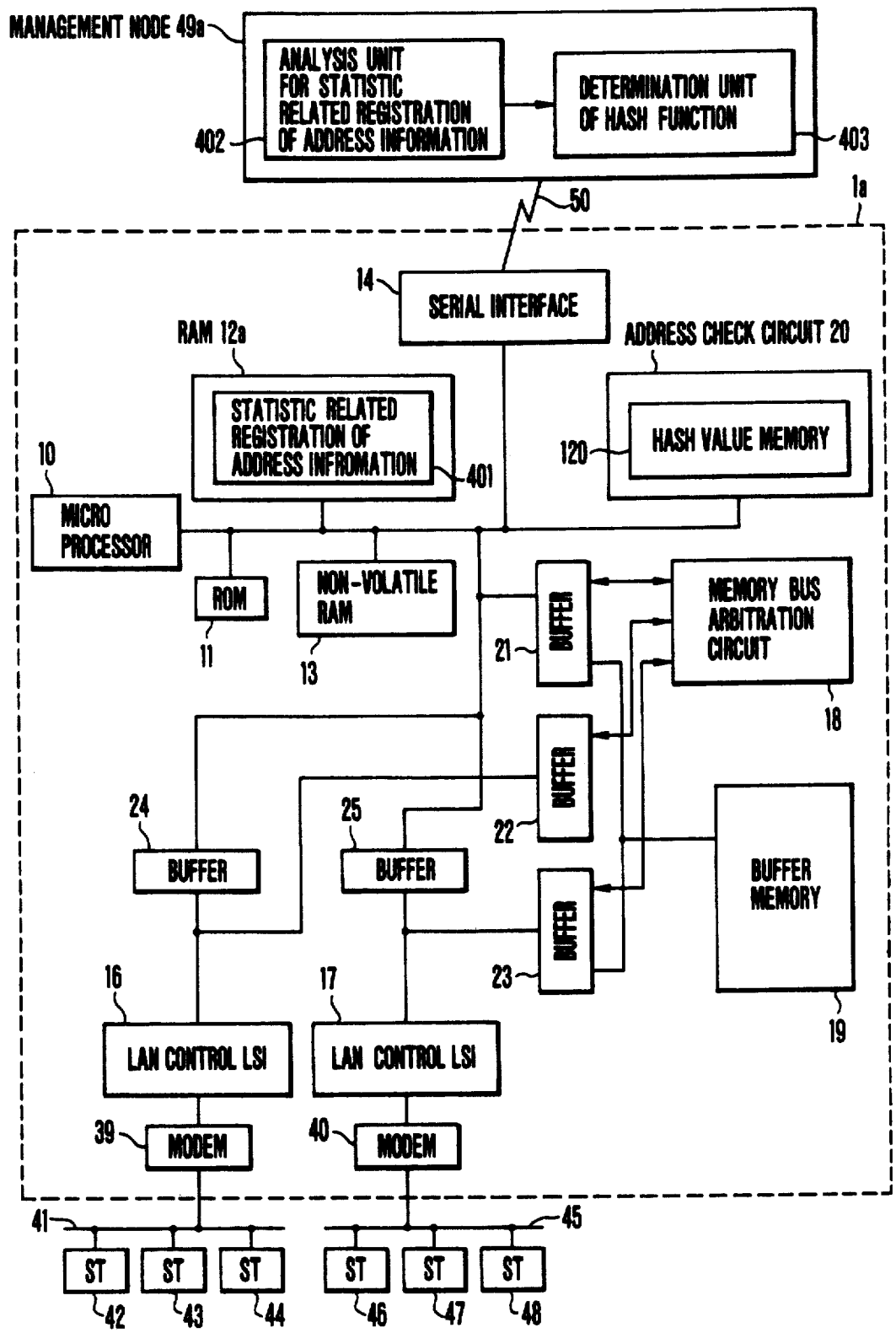
FIG. 9 is a diagram of a composition example of a bridge and a management node showing another embodiment.

FIG. 9 is a block diagram showing a second embodiment of the present invention. In the Figure, marks 10, 11, 13, 14, 16 to 25 and 41 to 48 indicate components same as those shown in FIG. 1. Further, 12a indicates a RAM which stores statistical information 401 related to address information registration, 49a indicates a management node including a unit 402 for analyzing the statistical information 401 and a unit 403 for determining a new hash function based on the analytical result of the analysis unit 402.

The basic operation of the bridge in the present embodiment is similar to that of above-described embodiment. The present embodiment relates to utilization of the result of statistical processing related to failing to register address information in the address check circuit in FIG. 7 which explains the frame forwarding processing flow of the bridge.

A bridge 1a checks, when a frame is received, whether the source station address of the frame has been registered in the address information RAM 101 or not, and tries to register the source station address and other attribute information in the address information RAM 101 when registration has not been made. At this time, in case the entry pointed by the hash address generated from the source station address is already in use, registration fails and statistic processing is performed. In such a manner, the statistical information collected in the statistical information 401 related to address information registration and the station address registered currently in the address check circuit are delivered to the analysis unit 402 for static related registration of address information in the management node 49a through a serial interface 14 and a communication line 50 by the request from the management node 49a. The analysis unit 402 for static related registration of address information analyzes the information sent from the bridge 1a and delivers the result thereof to the hash function determination unit 403. The hash function determination 403 determines the hash function which generates a hash address which is capable of making an effective use of the entry of the address information RAM 101 in the distribution of station addresses connected to the LAN based on the result of above-described analysis, and obtains the function value thereof and transfers it to the bridge 1a through the communication line 50.

The bridge 1a which receives a new hash function value makes all the entries of the address information RAM 101 in the address check circuit 20 void, and sets abovesaid new hash function value in the hash function value memory 120. Here, in case the analysis unit 402 for static related registration of address information and the hash function determination unit 403 can be packaged in the bridge 1a, they may be packaged in the bridge 1a.

According to above-described embodiment, when different station addresses are mapped in the same entry and "collision" which causes failure in registration of the address information occurs frequently no withstanding that characteristics of the hash function and the distribution of station addresses do not match each other and a plurality of vacancies exist in the entry of the address information RAM 101 in the address check circuit 20, it is possible to alter to a new hash function which makes "collision" to occur less frequently by means of analysis of statical information, thus having the effect of making the effective use of the address information RAM 101.

Besides, an example in which the management node 49a is connected directly to the bridge 1a through the communication line 50 in above-described embodiment, but the management node is connected to any LAN and the like, and it is also possible to compose communicably through the bridge.

Figure 10:
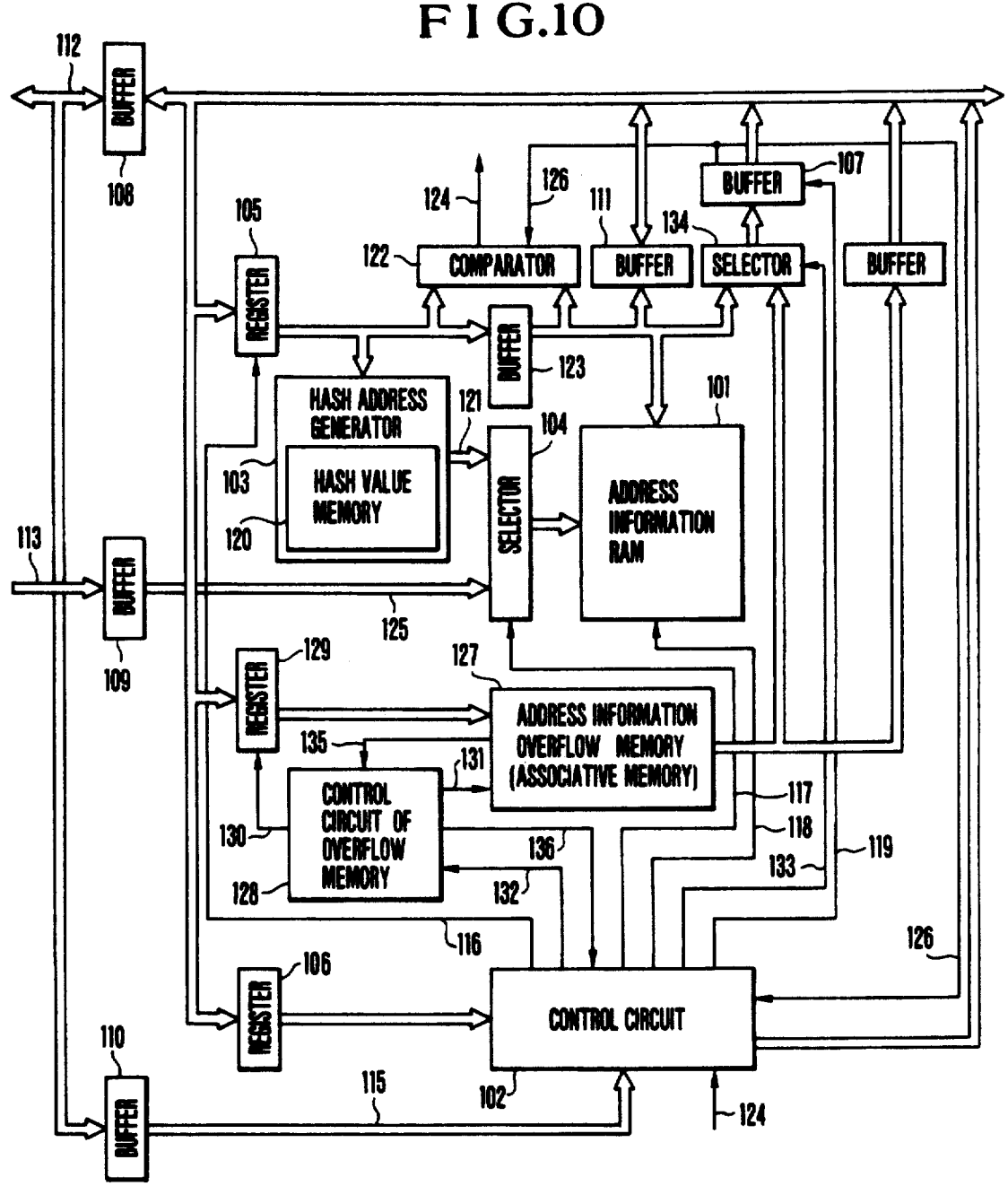
FIG. 10 is a diagram of a composition example of an address check circuit showing another embodiment.

Next, a third embodiment of the present invention will be described with reference to FIG. 10. FIG. 10 shows another composition example of an address check circuit packaged in the bridge 1 shown in FIG. 1, in which the composition of the embodiment shown in FIG. 2 is expanded. In the Figure, those components that are added to the composition of the embodiment shown in FIG. 2 are an address information overflow memory 127, a control circuit of overflow memory 128, a register 129 and a selector 134.

The operation of the present embodiment will be explained hereafter. First, when the processor 10 issues a command of address information search, search on both the address information RAM 101 and the address information overflow memory 127 is executed in parallel. Besides, search on the address information RAM 101 is similar to the case of the embodiment explained previously. Further, in the search on the address information overflow memory 127, comparison with the contents of station address fields of all the entries is made in parallel at the same time by inputting the station address because of the fact that this memory is an associative memory, and the result is notified to the control circuit 102 through a signal 135, an overflow memory control circuit 128 and a signal 136. As described later, it is controlled at the time of registration so that no registration is made in both the address information RAM 101 and the address information overflow memory 127 at the same time. Therefore, when the information of a search object is stored in either of the memories, the contents thereof and in which memory registration has been made are set to the register 107.

Next, when the processor 10 issues a command of address registration, registration in the address information RAM 101 is tried first by the operation of the embodiment described previously. As the result, when registration is successful, similar operation to the embodiment described previously is performed. When registration is unsuccessful, that is, the entry pointed by the generated hash address has been in use already, the control circuit 102 which is notified of such a result indicates the overflow memory control circuit 128 to register the address information in the address information overflow memory 127.

Against the foregoing, when there is an empty entry in the address information overflow memory 127, the overflow memory control circuit 128 registers the address information in that entry, and, when there is no vacancy, makes the entry having the smallest value of the age field among registered entries void and stores a new address information therein and notifies the control circuit 102 through the signal line 136. The control circuit 102 renews the contents of the register 107 so as to show that the address information has been registered in the address information overflow memory 127 against abovesaid notification.

Next, when the processor 10 issues a command of address information deletion, search of two memories is commenced at the same time in the similar manner as the case in which the command of address information search is issued. When there is an entry in which the designated station address and the station address portion of the entry are in accord with each other, the busy/free bit of the control field of the entry is set to free, and the contents of the register 107 is renewed so as to show completion of deletion to the register 107.

In above-described embodiment, it is not required to register the information registered in the address information overflow memory 127 in the address information RAM 101 over again, but it may be tried periodically to register the information registered in the address information overflow memory 127 in the address information RAM 101.

In the address check circuit in the embodiment described previously (see FIG. 2), when "collision" in which different station addresses are mapped in the same entry is generated and address information registration failure occurs frequently, it is possible to prevent broadcast to all LAN segments caused by that the address information cannot be registered from occurring by the system of registering in the address information overflow memory 127 according to the present embodiment, thus limiting the traffic of the LANs to the minimal.

Figure 11:
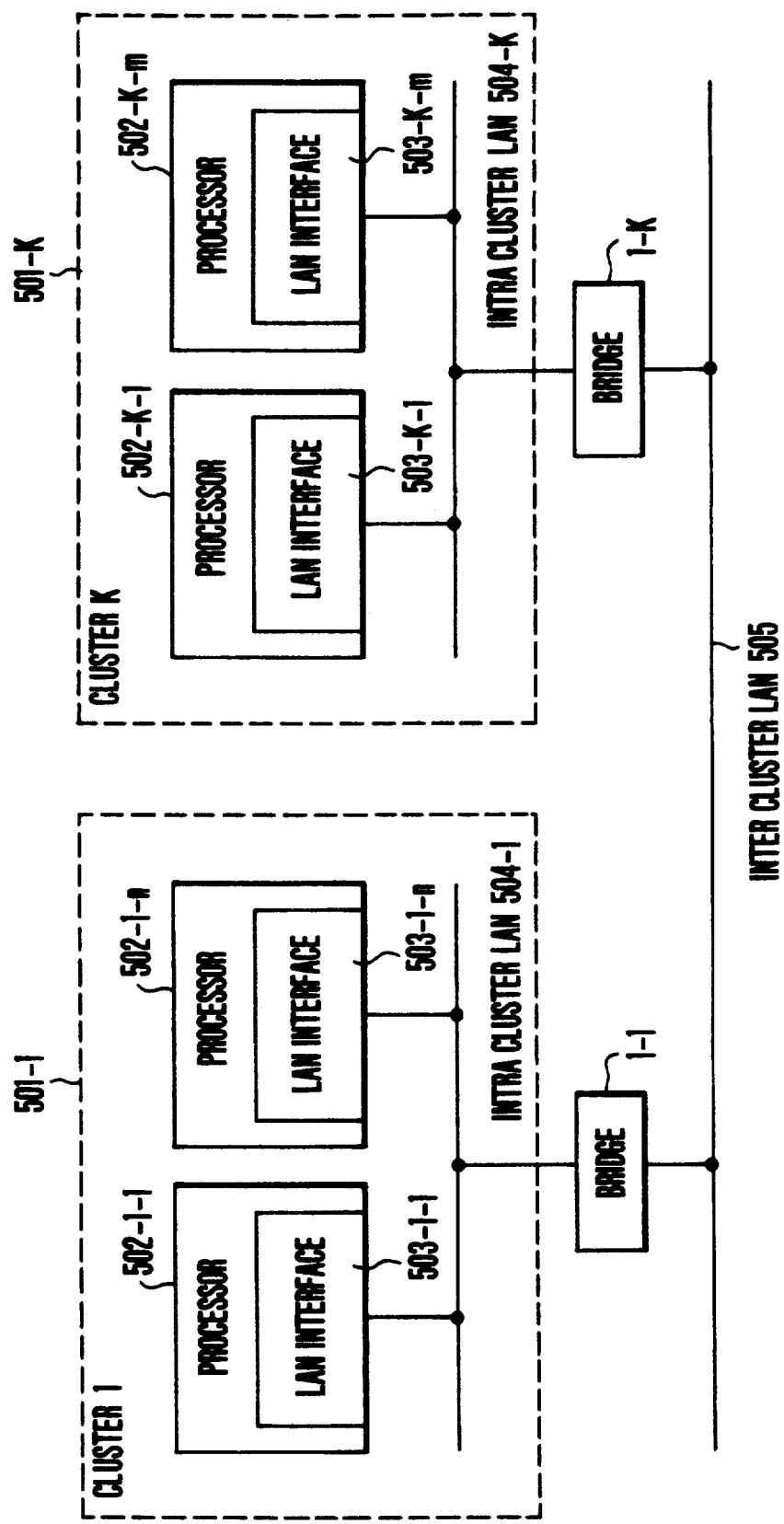
FIG. 11 is a diagram showing a composition example of an application system of the bridge.

Next, still another embodiment of the present invention will be explained in accordance with FIG. 11. FIG. 11 shows a composition example of an application system in which a bridge according to the present invention is used. In the Figure, 501-1 to 501-K indicate clusters composed of a plurality of processors, respectively, 502-1-1 to 502-K-M indicate processors, 503-1-1 to 503-K-M indicate LAN interface circuits which connect the processors to LANs, 504-1 to 504-K indicate LANs interconnecting processors in the clusters and 1-1 to 1-K indicate bridges which connect respective clusters to LANs interconnecting clusters. Besides, in FIG. 11, respective processors 502-101 to 502-K-M are able to communicate with processors in the clusters by means of LANs 504-1 to 504-K in the clusters. Furthermore, clusters 501-1 to 501-K are connected by an inter cluster LAN 505, thus making inter cluster communication possible.

In the present embodiment, the bridges 1-1 to 1-K are provided with an address learning function and a frame filtering function. Therefore, respective processors are able to perform inter processor communication without being conscious of which cluster it belongs to. For example, when the processor 502-1-1 sends an inter processor communication frame addressed to the processor 502-1-$n$ to the LAN 504-1 through the LAN interface circuit 503-1-1, the LAN interface circuit 503-1-$n$ of the processor 502-1-$n$ and the bridge 1-1 receive the frame. The LAN interface circuit 503-1-$n$ delivers the received frame to the processor 502-1-$n$.

The bridge 1-1 is conducting learning of the station addresses such as shown in abovesaid embodiment, and the frame is addressed to the station connected to the LAN 504-1 and needs not to be transferred to the other cluster. On the contrary, when the processor 502-1-1 forwards an inter processor communication frame addressed to the processor 502-K-1 to the LAN 504-1 through the LAN interface circuit 503-1-1, the bridge 1-1 receives the frame, and it is found that the destination station address is not located on the LAN 504-1 in this case by means of the address check circuit. Thereupon, the bridge 1-1 transmits the received frame to the inter cluster LAN 505. When the frame transmitted by the bridge 1-1 is received, the bridge 1-K transmits it to the LAN 504-K, and the LAN interface circuit 503-K-1 receives the frame, thus the frame arrives at the processor 502-K-1.

According to the present embodiment, the bridge learns the station addresses and executes filtering and transfer processing of the frame. Accordingly, respective processors are able to transmit the frame without being conscious of the location of the destination processor. In addition, movement of processors may also correspond without altering the softwares of the processors. Furthermore, it is also possible that processors of strong binding are connected in a cluster, frames extending across the clusters are connected by the inter cluster LANs, and the traffic of the communication path is split, thereby to secure responsibility.

These effects are produced by such a fact that it has become possible to couple rapidly among LANs by means of the bridge of the present invention.

Besides, above-described respective embodiments have been shown as examples of the present invention, but the present invention should not be limited to those embodiments.

As explained in details above, according to the present invention, the address check circuit has an address check control circuit which performs registration/deletion/search of the address information and an address information memory, and the address information memory is composed so that a mode of performing registration/deletion/search of the station address information by having table entry numbers correspond using hash values from given station addresses and a mode of referring directly from the processors are switchable, thereby to produce such remarkable effects that a bridge interconnecting networks may be realized, in which speed-up of address check processing for judgement of necessity for frame forwarding and the like and learning processing of station addresses of stations for interconnecting networks and minimization of the overhead may be aimed at, and rapid coupling among networks is made possible.

Further, mapping from the station addresses to the table entry numbers in the address check circuit according to the present invention is formed so that the hash values are computed in advance and stored in the memories. Thus, there is such an effect that hash values may be generated rapidly and simply with a small quantity of hardwares. Furthermore, there is also such an effect that, by making the hash value memory of the address check circuit erasable, the hash function may be changed into a new hash function in which collision is hard to be generated even when the characteristics of the hash function and the distribution of the station addresses do not match with each other and collision occurs frequently.

Moreover, there is also such an effect that, by adding an overflow memory formed by an associative memory to the address check circuit, the address information is stored in this overflow memory when collision occurs, and the address information search processing thereafter can be executed rapidly and filtering processing of a frame having this address as a destination is also made possible, thus enabling reduction of unnecessary traffic.

We claim:

1. A bridge apparatus for interconnecting networks each including a plurality of stations to forward a transmission frame received from a first network to a second network when said transmission frame includes as a destination address an identifier of a destination station which belongs to said second network, comprising:
    interface circuits each connected to one of said networks for controlling transmission of a transmission frame;
    a buffer memory for storing temporarily transmission frames received from said networks by said interface circuits;
    a data processor connected so as to communicate control signals with said interface circuits to perform delivery control of said received transmission frames; and
    an address check circuit connected to said data processor through a system bus for identifying a network to which a station specified by the destination address belongs to; said address check circuit including:
    hash memory means for storing hash computation results of station addresses and for outputting, when a station identifier is given as an access address, one of the hash computation results corresponding to said access address;
    an address memory for storing a plurality of address information records each including control information and identifiers of a station and a network to which the station is connected, said address memory being connected so as to be addressed by the output of said hash memory means and to notify said data processor of the contents of an address information record which corresponds to a station identifier having been designated by the data processor so that said data processor can instruct to one of said interface circuits selected on the basis of the contents of said notified address information record to forward the transmission frame stored in said buffer memory to a network connected to said instructed one interface circuit;
    a comparator connected to said address memory and said hash memory means so as to compare a station identifier designated by said data processor and a station identifier read out from an address information record stored in said address memory by addressing said address memory by using the output of said hash memory means when said designated station identifier is applied to said hash memory means as an access address thereof, and for generating a control signal to indicate whether said two station identifiers are coincident with each other or not when said address information record is not empty; and
    control means connected so as to receive a control command from said data processor through said system bus for controlling data read/write operation of said address memory in response to said received command, said control means operating to respond to said data processor a result of accessing to said address memory in accordance with the status of said control signal generated from said comparator.

2. A bridge apparatus for interconnecting networks according to claim 1, wherein, when said address check circuit responds to said data processor that the address information record which is to be corresponding to the station identifier designated by said data processor has not been registered in said address memory, said data processor issues a registration command for instructing said address check circuit to store a new address information record by designating a station identifier specified by a source address of the transmission frame to be forwarded and a network identifier assigned to a network from which the transmission frame is received,
    said control means operates in response to said registration command to a new address information record including said designated station identifier and network identifier in said address memory by applying said designated station address to said hash memory means as an access address.

3. A bridge apparatus for interconnecting networks according to claim 2, wherein:
    said address check circuit further includes at least one associative memory for storing a plurality of address information records, said associative memory being connected so as to be addressed by the station identifier designated by said processor; and
    said control means operates, when the control signal generated from said comparator indicates that the station identifier read out from said address information record stored in said address memory is different from the station identifier designated by said data processor, to store said new address information record in said associative memory.

4. A bridge apparatus for interconnecting networks according to claim 3, wherein said data processor includes means for instructing said interface circuits other than that connected to said first network to forward the transmission frame stored in said buffer memory to networks connected thereto when said address check circuit responds to said data processor that the address information record to be corresponding to the station identifier designated by said data processor has not been found in both of said address memory and said associative memory.

5. A bridge apparatus for interconnecting networks according to claim 3, wherein said control means notifies said data processor of, when said data processor issue a search command to instruct said address chock circuit to search a network identifier by designating a station address, the network identifier obtained from either one of said address memory and said associative memory.

6. A bridge apparatus for interconnecting networks according to claim 1, wherein said data processor includes means for instructing said interface circuits other than that connected to said first network to forward the transmission frame stored in said buffer memory to networks connected thereto when said address check circuit responds to said data processor that the address information record to be corresponding to the station identifier designated by said data processor has not been found in said address memory.

7. A bridge apparatus for interconnecting networks according to claim 1, wherein each of said address information records includes a count value as a part of the control information, and
said address check circuit comprises:
selector means for selecting either one of the memory address outputted from said hash memory means and a memory address designated by the data processor and for conducting the selected memory address to said address memory; and
means for controlling said selector means to select said memory address from said hash memory and to select said memory address from the data processor when said data processor is in a second operation mode;
said processor operates in said first mode so as to initialize the count value of an address information record which is referred to specify the network identifier in order to transmit the transmission frame, and operates in said second operation mode so as to read out every address information record periodically from said address memory by supplying memory addresses to said system bus sequentially to detect and update the count value of respective address information records by a predetermined unit value, and to invalidate the address information record in the address memory if the count value reaches a predetermined threshold value.

8. A bridge apparatus for interconnecting networks according to claim 7, wherein each of said address information records includes indication field for indicating that erase is inhibited, and said processor does not invalidate the address information record if the indication field indicates that the record is inhibited to erase even in a case the count value is at said threshold value.

9. A bridge apparatus for interconnecting networks each including a plurality of stations and for relaying a frame data received from a first one of said networks to a second one of said networks when said frame data includes a destination address corresponding to one of stations belonging to said second one network, comprising:
a plurality of interface means each connected to one of said networks for communicating a frame data with the network associated therewith;
buffer memory means for temporarily storing the frame data received by said interface means;
processor means for controlling the transmission of frame data stored in said buffer memory;
means for connecting said interface means, buffer memory means and said processor means; and
an address check circuit connected to said connecting means and operable in response to a control command with a station address issued from said processor means,
said address check circuit including:
internal bus means coupled with said connecting means;
address memory means for storing a plurality of data records each comprising data fields for indicating a station address, a network identifier and control information, which includes status information for indicating whether the data record is busy or free
hash memory means connected between said internal bus means and said address memory means, for supplying said address memory means with a memory address determined in accordance with the station address designated by said processor means, said memory address being shorter in length than said station address;
register means connected between said internal bus means and said address memory means, for temporarily storing at least the contents of the network identifier field and the control information field of a data record read out from said address memory means to deliver the stored contents to said processor means via said internal bus means and said connecting means and for generating a status signal in accordance with the status information included in the control information field;
comparator means responsive to said status signal for comparing said station address designated by said processor means with a station address which is read out as a part of one of said data records from said address memory means in accordance with said one memory address supplied from said hash memory means, and for generating a control signal indicating whether said two station addresses are coincident with each other or not when said status signal indicates that the data record is in a busy state; and
control means connected to said internal bus means and responsive to a control command issued from said processor means, the control signal generated from said comparator means and the status signal generated from said register means, for controlling read/write accesses to said address memory means and for informing said processor means of the execution result of said control command through said register means, said execution result being judged on the basis of said control signal and/or said status signal and informed to said processor means together with the stored contents of said register means;
said processor means operating so as to issue to said address check circuit a search command together with a station address specified by the destination address of the received data frame stored in said buffer memory means and to instruct to one of said interface means to transmit the received data frame to a network associated with said one interface means which is specified on the basis of information informed from said address check circuit via said connecting means.

10. A bridge apparatus for interconnecting networks according to claim 9, wherein said processor means comprises:
means for issuing to said address check circuit a second search command together with a station address specified by a source address of the received data frame for which said search command has been issued; and means for issuing to said address check circuit a registration command together with the station address specified by the source address of the received data frame and a network identifier assigned to the first one of said network;

wherein the control means of said address check circuit responds to said second search command so as to return information indicating whether a data record specified by said station address resides in said address memory means or not, and responds to said registration command so as to store a new data record in said address memory by using an memory address obtained from said hash memory means when said station address specified by the source address is applied to said hash memory means, said new data record including said station address specified by the source address and said network identifier assigned to the first one of said network.

11. A bridge apparatus for interconnecting networks according to claim 10, wherein said address check circuit further comprises:

associative memory means connected to said internal bus means so as to be addressed by the station address designated by said processor means; and selector means connected so as to selectively inputting one of outputs of said address memory means and said associative memory means to said register meals; wherein said control means controls to store a new data record in said associative memory means when the now data record is failed in storing to said address memory means and to control said selector means so as to conduct the contents of a data record read out from said associative memory means to said register means when a data record corresponding to the station address designated by said processor means is not find in said address memory means.

12. A bridge apparatus for interconnecting networks according to claim 11, wherein said processor means includes means for instructing another one of said plurality of interface means to transmit said received data frame stored in said buffer memory means to networks associated therewith when said address check circuit responds information indicating that the data record corresponding to the destination address designated by said processor means is not found in both of said address memory means and said associative memory means.

13. A bridge apparatus for interconnecting networks according to claim 10, wherein said address check circuit further comprises:

associative memory means for storing data records which are failed in storing in said address memory means, said associative memory means being connected to said internal bus means so as to be addressed by the station address designated by said processor means; and selector means connected so as to selectively inputting one of outputs of said address memory means and said associative memory means to said register means;

wherein said control means controls said selection means so as to conduct the contents of a data record read out from said associative memory means to said register means when a data record corresponding to the station address designated with said address check command by said processor means is not found in said address memory means.

14. A bridge apparatus for interconnecting networks according to claim 9, wherein said processor means includes means for instructing another one of said plurality of interface means to transmit said received data frame stored in said buffer memory means to networks associated therewith when said address check circuit responds information indicating that the data record corresponding to the destination address designated by said processor means is not found in said address memory means.

15. A bridge apparatus for interconnecting networks according to claim 9, wherein said address check circuit further comprises:

second internal bus means connected to said connecting means for supplying a memory address to said address memory means from said data processor means;

selector means connected so as to selectively conduct to said address memory means one of the memory address supplied by said hash memory means and a memory address supplied through said second internal bus means from said data processor means; and means for conducting the contents of a data record read out from said address memory means to said first mentioned internal bus means;

wherein said control means includes means for controlling said selector means so as to select the memory address given through said second internal bus means to apply to said address memory means so that a data record at said given memory address is read out from said address memory to said processor means through said conducting means.

16. A bridge apparatus for interconnecting networks according to claim 15, wherein each of said data records includes a count value as a part of the control information, and said data processor means includes:

means for initializing the count value of a data record when the data record is referred by said search command; and means for periodically read out each of data records from said address memory means by addressing them through said second internal bus means to update the count value of the data record by a predetermined value and for invalidating the data record in said address memory if the count value of the data record satisfies a predetermined condition.

17. A bridge apparatus for interconnecting networks according to claim 16, wherein each of said data records includes a indication bit as a part of the control information for indicating whether or not the data record is inhibited to erase, and said invalidating means does not invalidate the data record even in a case the count value satisfies said predetermined condition if the indication indicates an inhibition status.

* * * * *